United States Patent [19]

Kuwana et al.

[11] Patent Number: 4,846,535
[45] Date of Patent: Jul. 11, 1989

[54] ANTISKID APPARATUS

[75] Inventors: Kazutaka Kuwana, Toyota; Hiromu Kuromitsu, Chiryu; Hiroaki Takeuchi; Nobuyasu Nakanishi, both of Toyota; Tomohiko Hosoda, Nagoya, all of Japan

[73] Assignees: Aisin Seiki Kabushiki Kaisha, Kariya; Toyota Jidosha Kabushiki Kaisha, Toyota, both of Japan

[21] Appl. No.: 100,459

[22] Filed: Sep. 24, 1987

[30] Foreign Application Priority Data

Sep. 24, 1986 [JP] Japan .................................. 61-223839

[51] Int. Cl.⁴ .......................... B60T 8/34; B60T 8/40; F16K 3/00
[52] U.S. Cl. ................................... 303/117; 303/116; 251/333
[58] Field of Search ........................ 303/10, 56, 61, 93, 303/113, 114, 115, 116, 117, 119; 188/181 A, 349; 60/547.1, 591; 137/513.5, 513.7; 251/324, 333, 356

[56] References Cited

U.S. PATENT DOCUMENTS

| | | | |
|---|---|---|---|
| 3,431,028 | 3/1969 | Yoder | 188/349 |
| 3,521,934 | 7/1970 | Leiber . | |
| 3,659,905 | 5/1972 | Goulish | 303/114 |
| 3,722,960 | 3/1973 | Von Lowis of Menar | 303/115 |
| 3,746,402 | 7/1973 | Hickner et al. | 303/115 |
| 3,753,600 | 8/1973 | Gemmellaro | 303/119 |
| 3,787,094 | 1/1974 | Harned et al. | 303/113 |
| 3,801,161 | 4/1974 | Sharp | 303/116 |
| 3,844,623 | 10/1974 | Parsons et al. | 303/119 |
| 3,848,934 | 11/1974 | Grosseau | 303/119 |
| 3,877,756 | 4/1975 | Inada et al. | 303/114 |
| 3,905,655 | 5/1974 | de Gennes | 303/119 |
| 3,975,061 | 8/1976 | Kondo et al. | 303/68 X |
| 4,036,534 | 7/1977 | Kondo et al. | 303/115 |
| 4,050,748 | 9/1977 | Belart | 303/114 |
| 4,116,495 | 9/1978 | Belart | 303/116 |
| 4,129,341 | 12/1978 | Pauwels | 303/115 X |
| 4,138,165 | 2/1979 | Blomberg et al. | 303/61 X |
| 4,415,210 | 11/1983 | Belart et al. | 303/116 |
| 4,453,782 | 6/1984 | Arikawa et al. | 303/116 |
| 4,492,414 | 1/1985 | Kozakai et al. | 303/115 X |
| 4,526,426 | 7/1985 | Sato et al. | 303/115 |
| 4,552,413 | 11/1985 | Fujii et al. | 303/106 |

(List continued on next page.)

FOREIGN PATENT DOCUMENTS

| | | | |
|---|---|---|---|
| 2444765 | 4/1976 | Fed. Rep. of Germany | 303/116 |
| 3420687 | 12/1985 | Fed. Rep. of Germany | 60/547.1 |
| 0028944 | 8/1971 | Japan | 137/514.5 |
| 49-28307 | 7/1974 | Japan . | |
| 56-10219 | 3/1981 | Japan . | |
| 58-199258 | 11/1983 | Japan . | |
| 60-25834 | 2/1985 | Japan . | |
| 60-25835 | 2/1985 | Japan . | |
| 0071359 | 4/1985 | Japan | 303/116 |
| 62-187638 | 8/1987 | Japan . | |
| 62-187640 | 8/1987 | Japan . | |
| 62-191260 | 8/1987 | Japan . | |
| 2056606 | 8/1980 | United Kingdom | 303/116 |
| 2141195A | 12/1984 | United Kingdom . | |
| 2168771A | 6/1986 | United Kingdom . | |

OTHER PUBLICATIONS

Heinz Leiber et al., "Antilock System for Passenger Car with Digital Electronics–Design and Operation", 1979.

Primary Examiner—Andres Kashnikow
Assistant Examiner—Timothy Newholm
Attorney, Agent, or Firm—Burns, Doane, Swecker & Mathis

[57] ABSTRACT

An antiskid apparatus for an automotive vehicle including a cut-off valve having an inlet side to which a master cylinder is connected and an outlet side to which a wheel cylinder is connected for cutting off a supply of pressurized oil from the master cylinder to the wheel cylinder when an antiskid operation is performed, and a pump connected between the cut-off valve and wheel cylinder for supplying pressurized oil to the wheel cylinder when an antiskid operation is performed. The master cylinder and wheel cylinder being brought into slight communication via a microgroove in the spool of the cut-off valve when the spool is at a closed position. Pedal shock at antiskid operation is alleviated.

6 Claims, 3 Drawing Sheets

U.S. PATENT DOCUMENTS

| | | | |
|---|---|---|---|
| 4,578,951 | 4/1986 | Belart et al. | 303/119 X |
| 4,597,611 | 7/1986 | Nishimura et al. | 303/116 |
| 4,602,824 | 7/1986 | Nishimura et al. | 303/100 |
| 4,605,263 | 8/1986 | Ando et al. | 303/116 |
| 4,620,750 | 11/1986 | Leiber | 60/591 |
| 4,624,508 | 11/1986 | Adachi et al. | 303/116 |
| 4,636,008 | 1/1987 | Adachi et al. | 303/116 |
| 4,636,101 | 1/1987 | Adachi et al. | 303/116 |
| 4,641,895 | 2/1987 | Belart et al. | 60/547.1 |
| 4,652,061 | 3/1987 | Nishimura et al. | 303/116 |
| 4,655,509 | 4/1987 | Ando et al. | 303/115 |
| 4,674,805 | 6/1987 | Leiber | 303/114 |
| 4,678,243 | 7/1987 | Leiber | 303/119 |
| 4,685,747 | 8/1987 | Belart et al. | 303/114 |
| 4,703,979 | 11/1987 | Nakanishi et al. | 303/119 X |
| 4,715,666 | 12/1987 | Farr | 303/117 X |
| 4,728,155 | 3/1988 | Resch | 303/114 |
| 4,730,879 | 3/1988 | Adachi et al. | 303/116 |
| 4,750,329 | 6/1988 | Horiuchi et al. | 303/114 |
| 4,750,788 | 6/1988 | Seibert et al. | 303/119 X |
| 4,754,605 | 7/1988 | Seibert et al. | 60/591 |

ANTISKID APPARATUS

BACKGROUND

This invention relates to an antiskid apparatus for automotive vehicles.

An example of a conventional antiskid apparatus for automotive vehicles is disclosed in the specification of Japanese Patent Publication (KOKOKU) No. 49-28307.

As shown in FIG. 6, the conventional antiskid apparatus has an inlet solenoid valve 3 arranged between a master cylinder 1 and a wheel brake 2, and an outlet solenoid valve 5 arranged between the wheel brake 2 and a reservoir 4. A pump 6 is arranged between the reservoir 4 and the master cylinder 1 and the circuit arrangement is such that a working fluid discharge from the pump 6 circulates to the master cylinder 1 and inlet solenoid 3.

Thus, the circuit arrangement is such that the working fluid is circulated between the master cylinder 1 and inlet solenoid 3 in the conventional antiskid apparatus. Consequently, when the inlet solenoid valve 3 is closed at operation of the antiskid function, the fluid pressure increases between the inlet solenoid valve 3 and pump 6, and this pressure is applied directly to the master cylinder 1, as a result of which the brake pedal 7 is forced backward. When the inlet solenoid valve 3 is opened, there is a decrease in the fluid pressure between the inlet solenoid valve 3 and the pump 6, so that the pedal 7 is drawn inward. Owing to repeated opening and closing of the inlet solenoid valve 3 at high speed when the antiskid operation is in effect, the pedal 7 is caused to undergo considerable vibration and the driver is subjected to discomfort as a result. If this pedal shock were to be completely eliminated, however, the driver would no longer be able to feel the antiskid action.

SUMMARY OF THE DISCLOSURE

The present invention seeks to eliminate the aforementioned drawback of the prior-art antiskid apparatus and its object is to provide a novel antiskid apparatus capable of alleviating pedal shock during the antiskid operation and of transmitting a favorable antiskid sensation to the driver.

According to the present invention, the foregoing object is attained by providing an antiskid apparatus for an automotive vehicle comprising: a master cylinder; a wheel cylinder; a cut-off valve having a spool, an inlet side to which the master cylinder is connected and an outlet side to which the wheel cylinder is connected for cutting off a supply of pressurized oil from the master cylinder to the wheel cylinder when an antiskid operation is performed; and a pump connected between the cut-off valve and the wheel cylinder for supplying pressurized oil to the wheel cylinder when an antiskid operation is performed; the master cyliner and wheel cylinder being brought into slight communication when the spool of the cut-off valve is closed.

In an embodiment of the invention, the cut-off valve comprises a spool valve in which the spool is closed when an antiskid operation is performed. When the spool is closed, the master cylinder and wheel cylinder are brought into communication via a microgroove formed in the spool or cylinder.

In another embodiment of the invention, the cut-off valve comprises a valve element (e.g., spool valve or ball valve) which is closed when an antiskid operation is performed. When the valve element is closed, the master cylinder and wheel cylinder are brought into communication via a clearance between the valve element and the cylinder.

In operation, pressurized oil is supplied from the master cylinder to the wheel cylinder to apply braking when the brake pedal is depressed while the vehicle is traveling in ordinary fashion.

At operation of the antiskid function, the spool of the cut-off valve is closed by an expedient such as changeover of the solenoid valve, so that the supply of pressurized oil from the master cylinder to the wheel cylinder is cut off. Pressurized oil from the wheel cylinder is discharged into the reservoir to reduce the wheel cylinder pressure. During the antiskid operation, a minute increase and decrease in the wheel cylinder pressure is repeated as by opening and closing of the solenoid valve and operation of the pump.

Even though the spool of the cut-off valve is closed at this time, the slight increase and decrease in the wheel cylinder pressure caused by the pump is transmitted from the wheel cylinder to the master cylinder via the spool due to the slight communication between the master cylinder and the wheel cylinder. As a result, the driver is capable of feeling the antiskid action from the brake pedal. However, since the major portions of the wheel cylinder pressure and pump pressure are cut off by the spool, there is absolutely no risk of a large pedal shock being produced.

The antiskid apparatus of the invention has a number of advantages. Specifically, since the major portions of the wheel cylinder pressure and the pump pressure are cut off by the spool of the cut-off valve when the antiskid operation is performed, there is no fear of a large pedal shock being produced. However, since the spool brings the master cylinder and the wheel cylinder into slight communication even when it is closed, the slight increase and decrease in the wheel cylinder pressure caused by operation of the pump is transmitted to the master cylinder. As a result, the driver is capable of feeling a suitable degree of antiskid action from the brake pedal.

Other features and advantages of the present invention will be apparent from the following description taken in conjunction with the accompanying drawings.

DETAILED DESCRIPTION

A preferred embodiment of an antiskid apparatus will now be described with reference to the drawings.

Figure 1:
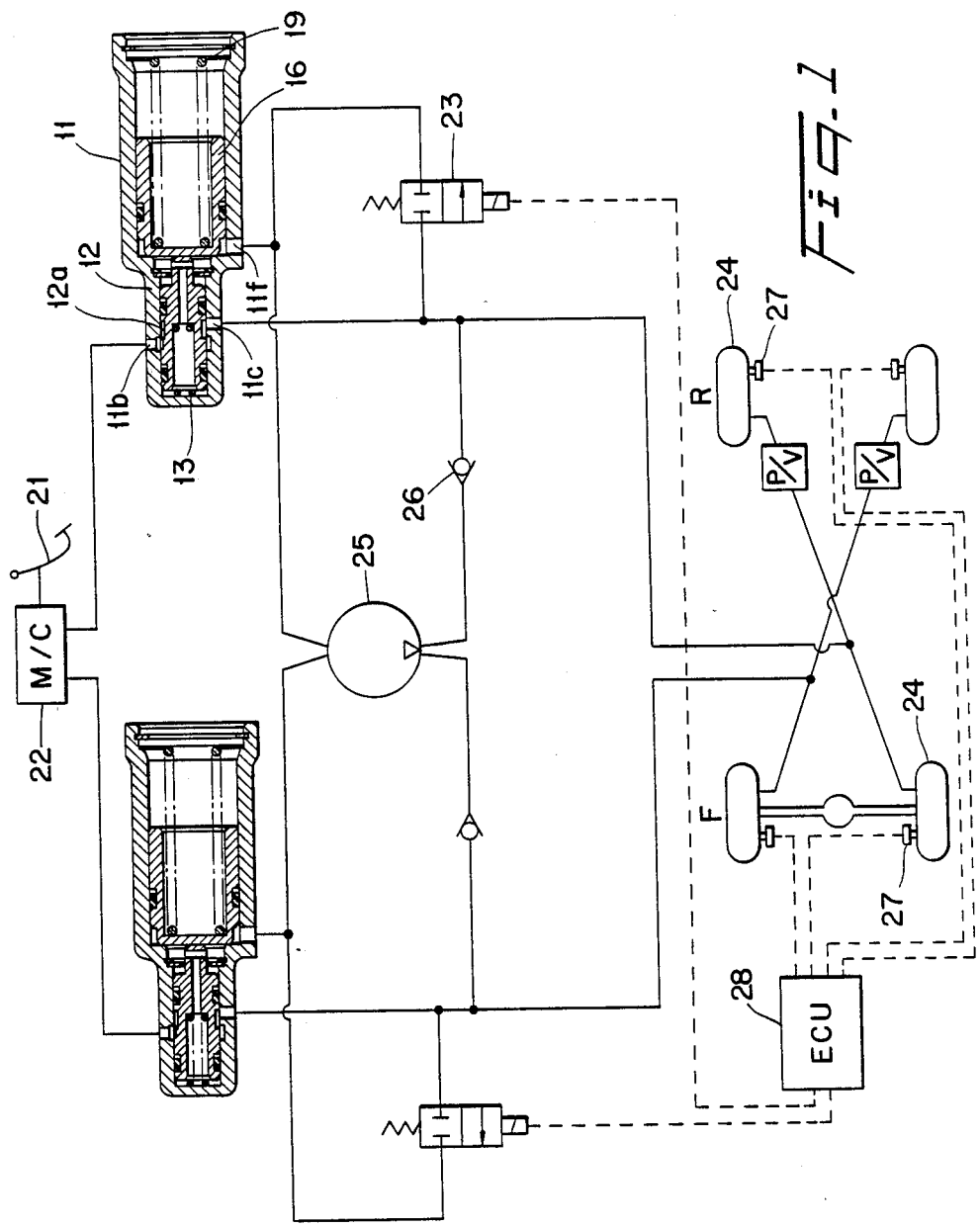
FIG. 1 is a hydraulic circuit diagram illustrating an embodiment of the present invention.

FIG. 1 illustrates an embodiment of the present invention applied to 2-channel, 4-sensor brake system in which both channels are identically constructed. Accordingly, in the description that follows, only one channel shown on the right side will be described. FIG.

2 illustrates only the one channel of the brake system of FIG. 1, with a hydraulic pressure cut-off valve being shown in an enlarged form.

Figure 2:
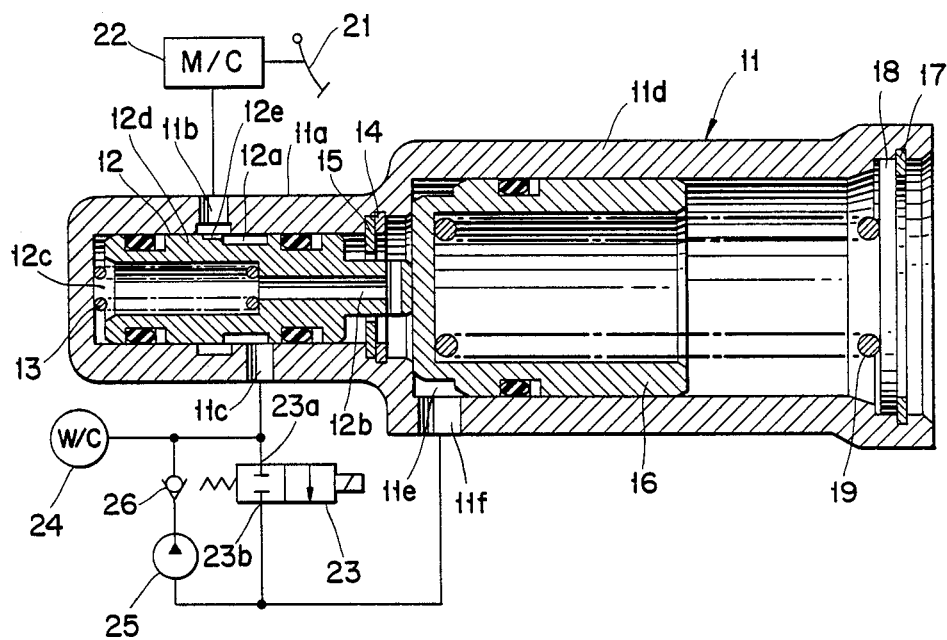
FIG. 2 an enlarged sectional view illustrating a cut-off valve in the same embodiment.

As shown in FIGS. 1 and 2, a spool 12 is freely slidably inserted into the interior of a small-diameter cylinder 11a on the left side of a valve 11. An annular communication groove 12a is formed on the outer peripheral portion of the spool 12 at the central portion thereof. The cylinder 11a is formed to include an inlet port 11b and an outlet port 11c, both of which are in communication with the communication groove 12a of the spool 12. When the spool 12 is slid leftward in FIG. 2, the communication between the inlet port 11b and the communication groove 12a is substantially interrupted, as shown in FIG. 3.

Figure 3:
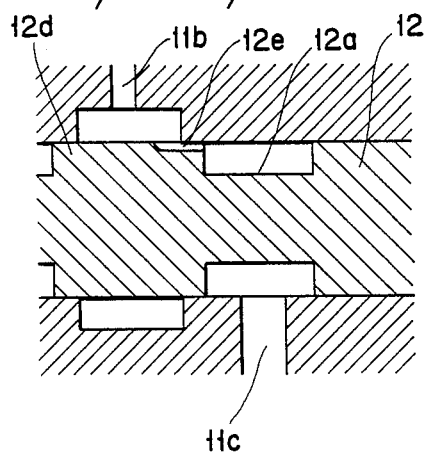
FIG. 3 is an enlarged, partially sectional view illustrating the principal portion of the invention according to the same embodiment.
Figure 4:
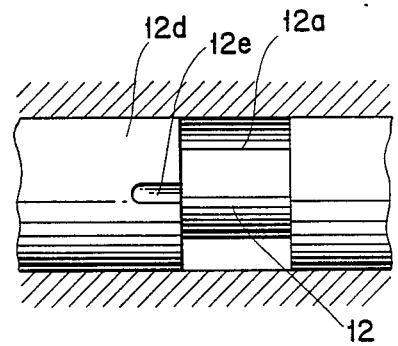
FIG. 4 is a plan view of the same.

As best shown in FIGS. 3 and 4, the spool 12 has a land 12d on the left side of the communication groove 12a, and a microgroove 12e is formed in the outer peripheral surface of the land 12d. The microgroove 12e brings the inlet pot 11b and the communication groove 12a into slight communication even when the inlet port 11b and communication groove 12a are at a position to cut off from each other by the land 12d.

A spring 13 is loaded between the cylinder wall and the spool 12 on the left end thereof as shown in FIG. 2 and urges the spool rightward, namely in a direction which causes the spool 12 to cut off communication between the inlet port 11b and the communication groove 12a. The spool 12 is allowed to slide until it engages a stopper 15 secured by a snap ring 14 to the inner peripheral wall of the cylinder 11a on the right end thereof. It should be noted that the small-diameter cylinder 11a, the spool 12 and the spring 13 construct a cut-off valve.

A piston 16 is freely slidably inserted into the interior of a large-diameter cylinder 11d on the right side of the valve 11 as shown in FIG. 2. The piston 16 is urged so as to slide leftwardly in the Figure by a spring 19 loaded between the piston 16 and a plate 18 secured to the right end portion of the cylinder 11d by a snap ring 17. The large-diameter cylinder 11d, the piston 16 and the spring 19 construct a reservoir.

A projecting portion on the right end of the spool 12 butts against the left end face of the piston 16. In the absence of pressure, the piston 16 and spool 12 are situated on the left-end side of the cylinders 11d and 11a due to the spring 19.

Formed between the spool 12 and the piston 16 is a reservoir chamber 11e in communication with a port 11f formed in the wall of cylinder 11d. The spool 12 is formed to include an axially extending through-hole 12b which communicates an oil chamber 12 on the left side of the spool 12 with the reservoir chamber 11e.

A master cylinder 22 linked to a brake pedal 21 is connected to the inlet port 11b of the cylinder 11a, and an input side 23a of a normally-closed solenoid valve 23 is connected to the outlet port 11c. An output side 23b of the solenoid valve 23 is connected to the port 11f of cylinder 11c. The arrangement is such that the outlet port 11c and the inlet port 11b are brought into communication by switching the solenoid valve 23.

A wheel brake 24 is connected to a point in a line between the outlet port 11c and the input side 23a of the solenoid valve 23. A pump 25 with its intake side is connected to the output side 23b of the solenoid valve 23. The pump 25 supplies a working oil to the wheel brake 24 or input side 23a of the solenoid valve 23 via a check valve 26.

The operation of the foregoing hydraulic pressure control circuit will now be described. When the vehicle is traveling in the ordinary manner, the piston 16 is urged into contact with the left end face of the cylinder 11d by the spring 19, so that the spool 12 is also urged against the force of spring 13 by the piston 16 and is situated at the left end of the cylinder 11a. If the driver now steps down on the brake pedal 21, pressurized oil from the master cylinder 22 is supplied to the wheel brake 24 via the inlet port 11b, communication groove 12a and outlet port 11c, as a result of which the usual braking force is applied.

When the brake pedal 21 is depressed and a sensor 27 senses that lock-up of the corresponding vehicle wheel is about to occur at sudden braking, the solenoid valve 23 is changed over from the closed to the open state by a signal from a computerized electronic control unit (ECU)28. As a result, pressurized oil from the wheel brake 24 is discharged into the reservoir chamber 11e via the solenoid valve 23 and port 11f.

The pressurized oil dicharged into the reservoir chamber 11e urges the piston 16 rightward in FIG. 2 against the force of the spring 19 due to a difference in the areas of the pressure-receiving surfaces of the piston 16 and the spool 12. When the piston 16 is slid rightward, the spool 12 is slid rightward under the urging force of the spring 13 until it engages the stopper 15.

When the spool 12 is thus slid rightward, the inlet port 11b and the communication groove 12 are placed to a position to cut off from each other by the land 12d, thereby substantially cutting off the pressurized oil from the master cylinder 22. Owing to the discharge of pressurized oil of wheel brake 24 into the reservoir chamber 11e, the wheel cylinder pressure drops and the braking force is reduced. The pressures in the reservoir chamber 11e and the oil chamber 12c are balanced by the communication groove 12b, so that the spool 12 does not receive an axially directed force due to these pressures.

At this time the pump 25 is turned on so that pressurized oil is circulated through the pump 25, check valve 26, solenoid valve 23 and pump 25 in the order mentioned.

When the wheel locking state is eliminated by the reduction in pressure in the wheel brake 24, the solenoid valve 23 is restored by a signal from the control unit (ECT)28, whereby the communication between the input and output sides 23a, 23b thereof is cut off. Pressurized oil is supplied to the wheel brake 24 by the pump 25 so that there is a slight increase in the cylinder pressure.

Figure 5:
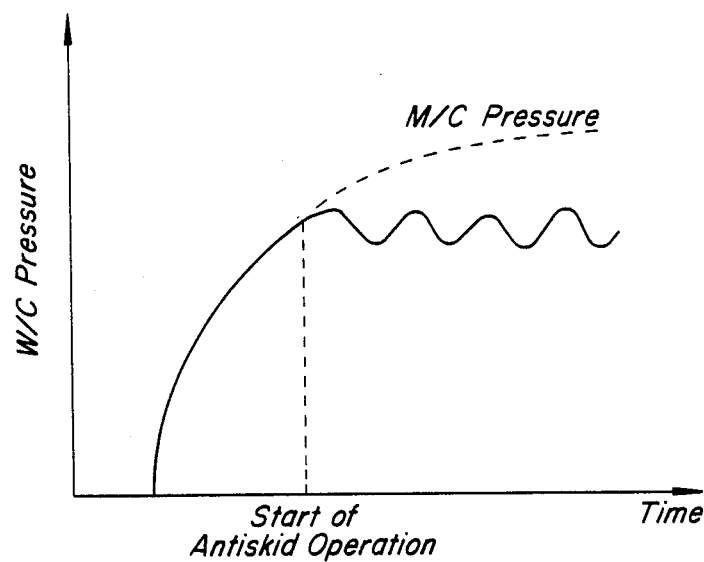
FIG. 5 is a view illustrating a change in wheel cylinder pressure with elapsed time.
Figure 6:
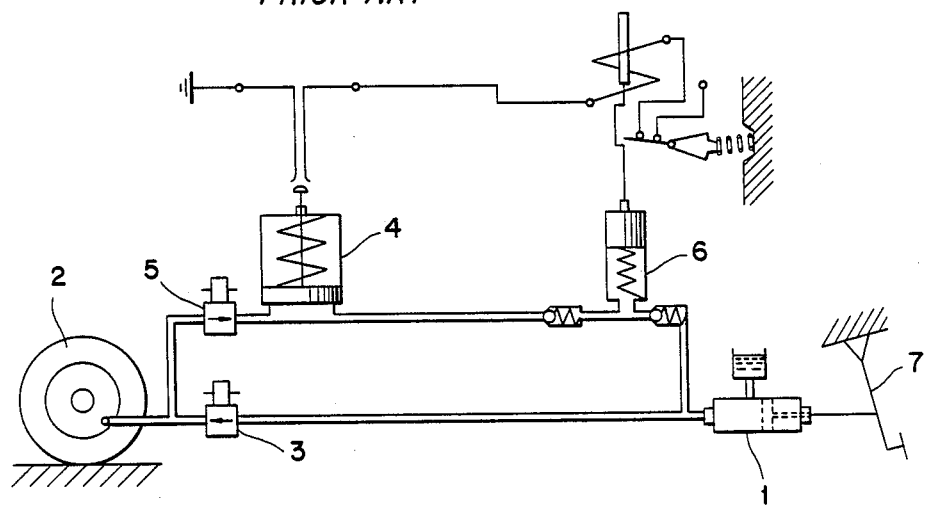
FIG. 6 is a hydraulic circuit diagram illustrating an antiskid apparatus according to the prior art.

In the state where the master cylinder pressure is cut off by the spool 12, the switching of the solenoid valve 23 is repeated at a high speed so that the wheel cylinder pressure increases and decreases slightly in repetitive fashion, as shown in FIG. 5, whereby antiskid control is performed.

Since the communication groove 12a of valve 11 and the inlet port 11b are in slight communication due to the microgroove 12e during the antiskid operation even at the cut off state, the change in the wheel cylinder pressure is transmitted to the brake pedal 21 via the master cylinder 22 as the solenoid valve 23 is opened and closed, so that the driver is capable of feeling a suitable degree of antiskid action conforming to the size of the microgroove 12e. However, most of the wheel cylinder pressure or pump pressure is cut off by the land 12d of spool 12, the driver is not subjected to a large pedal shock.

At the end of the antiskid operation, the solenoid valve 23 is restored and pressurized oil in the reservoir 11e is pumped out by the pump 25. As a result, the piston 16 is slid leftward under the urging force of the spring 19. Concurrently, the spool 12 is slid leftward and is restored to its original position. The inlet port 11b and the communication groove 12a are brought into communication, so that the master cylinder 22 and the wheel brake 24 are re-communicated, thus making ordinary braking possible.

In the above-described embodiment, the microgroove 12e formed in the spool 12 can be freely set in terms of the shape and number thereof and suitable selection makes it possible to optimize the antiskid operation felt by the driver. It is also permissible to form the microgroove in the cylinder rather than in the spool.

Further, rather than forming the microgroove 12e, it is possible to form a small clearance that will prevail between the land 12d and the inlet port 11b when the spool 12 is at the closed position.

However, if the microgroove 12e is provided in the outer peripheral surface of the land 12d of the spool 12, any foreign matter from the working oil that clogs the groove 12e can be readily removed by the flow of pressurized oil when the land 12d opens the port 11b.

Further, though the foregoing embodiment relates to a case in which the invention is applied to a 2-channel, 4-sensor brake system, the invention can also be readily applied to an arrangement having a greater number of control systems.

In addition, in the above-described embodiment, the cut-off valve that cuts off the supply of pressurized oil from the master cylinder to the wheel cylinder at the time of antiskid operation is a spool-type valve. However, the invention is not limited to a spool-type valve, for a cut-off ball-type valve may also be employed, in which case it would suffice to form the microgroove in a seat face contacted by the cut-off ball.

As many apparently widely different embodiments of the present invention can be made without departing from the spirit and scope as disclosed and claimed hereinbelow, it is to be understood that the invention is not limited to the specific embodiments thereof except as defined in the appended claims.

What is claimed is:

1. An antiskid apparatus for an automotive vehicle comprising:
   a master cylinder;
   a wheel cylinder;
   a cut-off valve including a casing and a spool slidable in said casing, an inlet side and an outlet side, said inlet side being connected to said master cylinder and said outlet side being connected to said wheel cylinder, said cut-off valve adapted to interrupt a supply of pressurized oil from said master cylinder to said wheel cylinder to provide an antiskid operation, said spool being moved from an open to a closed position during an antiskid operation, said cut-off valve having a microgroove providing slight communication between said master cylinder and said wheel cylinder during said antiskid operation;
   a pump connected between said cut-off valve and said wheel cylinder, the pump supplying pressurized oil to said wheel cylinder during said antiskid operation;
   a solenoid valve connected between the wheel cylinder and an intake side of the pump, said solenoid valve being repetitively closed and opened during said antiskid operation; and
   a reservoir connected with said intake side of said pump and with said solenoid valve, said solenoid valve providing connection of said reservoir with said wheel cylinder, said reservoir having a piston urged by a first spring towards the open position of said spool, an end of said spool butting against said piston by means of a second spring so that the spool slides as the piston slides.

2. The antiskid apparatus according to claim 1, wherein said reservoir is formed integral with said cut-off valve.

3. The antiskid apparatus according to claim 1, wherein said reservoir serves as an actuator for the cut-off valve.

4. The antiskid apparatus according claim 1, wherein said solenoid valve is controlled by an electric control unit which outputs a control signal to the solenoid valve in response to a skid state of a wheel.

5. The antiskid apparatus according to claim 1, wherein said microgroove is formed in said spool slidable in said casing.

6. The antiskid apparatus according to claim 1, wherein said microgroove is formed in the casing of said cut-off valve.

* * * * *